United States Patent [19]
Hashimoto

[11] Patent Number: 5,725,682
[45] Date of Patent: Mar. 10, 1998

[54] BRAZING METHOD

[75] Inventor: Akira Hashimoto, Higashihiroshima, Japan

[73] Assignee: Mazda Motor Corporation, Hiroshima, Japan

[21] Appl. No.: 595,687

[22] Filed: Feb. 2, 1996

[30] Foreign Application Priority Data

Feb. 2, 1995 [JP] Japan ................................. 7-039314

[51] Int. Cl.$^6$ ................................................. C23C 8/20
[52] U.S. Cl. ................................ 148/220; 148/528
[58] Field of Search ........................... 148/220, 528; 420/469, 487

[56] References Cited

U.S. PATENT DOCUMENTS 4,294,630  10/1981  Watanabe et al. ................. 148/220

FOREIGN PATENT DOCUMENTS 1-237096   9/1989   Japan .
406192737  7/1994   Japan ................................. 148/220
244093     4/1978   Russian Federation ......... 420/487
2157318   10/1985   United Kingdom .............. 420/487

*Primary Examiner*—Deborah Yee
*Attorney, Agent, or Firm*—Smith Patent Office

[57] ABSTRACT

Brazing alloys used in a method of brazing at least two steel components into an integral part during a carburizing treatment followed by a quenching treatment are disclosed. These alloys should be in a liquid phase during the carburizing process in which the steel components with a brazing alloy placed therebetween are carburized at a temperature of approximately 930° C., and in a solid phase at a temperature of approximately 850° C. attained immediately before the quenching treatment. A Cu—Mn brazing alloy containing at least from 55 to 80 weight % of copper and from 20 to 45 weight % of manganese or a Cu—Mn—Ni brazing alloy containing at least from 20 to 45 weight % of manganese and from 0 to 15 weight % of nickel are suitable for the simultaneous brazing and carburizing process.

10 Claims, 5 Drawing Sheets

| SAMPLE No. | COMPONENT(wt %) | | |
|---|---|---|---|
| | Cu | Mn | Ni |
| M1 | 75 | 25 | 0 |
| M2 | 65 | 35 | 0 |
| M3 | 55 | 45 | 0 |
| M4 | 56 | 38 | 6 |
| M5 | 50 | 44 | 6 |
| M6 | 50 | 41 | 9 |
| M7 | 45 | 45 | 10 |

BRAZING METHOD

BACKGROUND OF THE INVENTION

1. Field of the Invention

The invention relates to a method of brazing and a brazing material used therein. More particularly the invention relates to a method of performing a simultaneous brazing and carburizing treatment accompanied by a subsequent quenching treatment for forming an integral assembly from a plurality of separate steel components.

2. Description of the Related Art

Conventionally, helical gears and clutch cones used in automotive manual transmissions are formed initially as two separate pieces and are subsequently joined into a one piece gear assembly by means of electron beam welding. The electron beam welding process, however, has shortcomings such as partial weld penetration and irregular hardening which result in heat distortion of the clutch cone, the need for a specialized vacuum chamber, the consumption of a large amount of disposable process items, and high maintenance costs. There has been proposed a brazing method, which is able to supersede the electron beam welding process, in which a gear assembly comprised of a helical gear and a clutch cone is brazed with a brazing alloy during a carburizing treatment. As is known from Japanese Unexamined Patent Publication No. 1-237096 (1989), an alloy, as one of brazing materials, contains 5–10 weight % of copper (Cu), 20–50 weight % of silver (Ag), and 5–10 weight % of tin (Sn) as its main components.

The brazing alloy proposed in Japanese Unexamined Patent Publication No. 1-237096 (1989) must satisfy the following conditions for use in a steel brazing process executed during carburizing, after which quenching treatment is applied to the brazed steel parts.

1) Because the carburizing temperature is established at 980° C. and is reduced to 850° C. directly before quenching, the solid phase of the brazing alloy should be established above a temperature of 850° C. and the liquid phase below a temperature of 930° C.;

2) From the standpoint of easy handling in mass production, the brazing alloy should be formable into a wire configuration; and 3) The brazing alloy must have mechanical characteristics which provide high shearing strength for the brazed steel parts. For instance, it must have mechanical characteristics such that the brazed helical gear-clutch cone assembly yields the shearing strength above 17 kgf/mm$^2$.

Silver (Ag) alloys, gold (Au) alloys, nickel (Ni) alloys, copper (Cu) alloys, copper-platinum (Cu—P) alloys, and copper-zinc (CuoZn) alloys are conventionally used as brazing alloys for steel components.

Because the brazing alloy suggested in Japanese Unexamined Patent Publication No. 1-237096 (1989) has difficulty satisfying the mechanical characteristics according to the demand for high shearing strength, and more specifically, it has difficulty in satisfying the shearing strength requirement of 17 kgf/mm$^2$ desired for a helical gear-clutch cone assembly, it has become necessary to enlarge the brazing contact surfaces between these two pieces. This in turn results in relatively large gear parts. Furthermore, if the composition of the brazing alloy is not properly formulated, the strength of brazed joint is lowered due to the possibility of the brazing alloy entering a solid phase at a temperature below 850° C. Improper composition also lowers the strength of the joint since the brazing alloy may not be completely solidified after initiation of quenching and continuously maintained in the solid phase as the quenching treatment progresses.

As the conventionally known brazing alloys do not satisfy the essential conditions described above, these brazing alloys are not practical for a brazing process in which a helical gear-clutch cone assembly is brazed during carburizing to form an integral helical gear.

SUMMARY OF THE INVENTION

It is an object of the invention to provide a method of simultaneously brazing and carburizing at least two steel or metal components as an integral part followed by a subsequent quenching treatment. It is a further object of the invention to provide a noble brazing alloy used in such a simultaneous brazing and carburizing method.

The above objects of the invention are accomplished by a process including the steps of 1) placing a brazing alloy, containing copper (Cu) and manganese (Mn) as its main components and having a ring configuration, between two steel components, for instance a helical gear and a clutch cone used as an integral gear component of an automotive manual transmission, in close proximity to or at a position where the brazed joint is expected to form; 2) heating the steel components with the brazing alloy placed therein for carburization in a carburizing furnace through a process whereby the components are simultaneously carburized by brazing; and 3) lowering the temperature of the brazed and carburized steel components for a quenching treatment.

The brazing alloy basically comprises copper (Cu) and manganese (Mn) as its main components, the amount of the manganese (Mn) component being between 20 and 45 weight % of the brazing alloy. The brazing alloy may contain a nickel (Ni) additive in an amount between 0 to 15 weight % of the brazing alloy.

The brazing alloy filler may be formed into an open-ring or closed-ring configuration.

The brazing alloy comprising main components of copper (Cu) and manganese (Mn) assumes a liquid phase at a carburizing temperature of steel, which is approximately 930° C., and assumes a sufficiently solid phase at a quenching temperature of approximately 850° C. attained immediately prior to quenching treatment. These temperatures allow brazing of the steel components together during the carburizing treatment and assure the mechanical strength of the brazed joint since solidification has occurred prior to the initiation of the quenching treatment. Moreover, even though the inclusion of the manganese (Mn) component increases the hardness of the brazing alloy, the alloy can still be formed into a wire configuration. Since this alloy can be made into specific shapes, it lends itself well to mass production applications and contributes to lower brazing costs.

The brazing alloy, comprised of copper (Cu) and manganese (Mn) as its main components with the proportion of manganese (Mn) comprising from 20 to 45 weight %, is held in a liquid phase when the steel components undergo the carburizing treatment at approximately 930° C. The alloy can be subsequently maintained in a solid phase at approximately 870° C., which is the lower limit temperature for the brazing alloy to not enter a liquid phase and is higher than the temperature of approximately 850° C. encountered immediately before the steel components undergoes the quenching treatment.

The brazing alloy further contains a nickel (Ni) component from 0 to 15 weight %. This relatively small amount offers a higher degree of brazed joint strength and improved wetting characteristics which result in enabling the brazing alloy to adequately fill minute gaps between the joined steel components. The brazing alloy is formed in an open-ring or closed-ring filler configuration, and is easily placed in position in a manner which results in reduced costs of brazing in mass production applications.

The brazing process joins the helical gear and the clutch cone into an integral piece structure while suppressing thermal distortion of the steel components to a minimum during carburization. This process thus allows the manufacture of high quality integral gear components.

The brazing alloy containing manganese (Mn) in an amount between 20 to 45 weight % enables lower liquid and solid phase transition temperatures, and is capable of being formed into a wire configuration, allowing excellent applicability to a mass production brazing process. As was previously discussed, because the brazing alloy assumes a liquid phase at the steel component carburizing temperature of, for instance, approximately 930° C., and assumes a sufficiently solid phase at the temperature attained immediately before the quenching temperature of, for instance, approximately 850° C., it is possible to braze the steel components together during carburization. Further, the brazing alloy containing nickel (Ni) in an amount from 0 to 15 weight % assures an increase in the mechanical strength of brazed joint. Moreover, the brazing alloy in the liquid phase as applied to metal components, in particular steel components, has an improved wetting characteristic which results in sufficiently filling gaps between the brazing surfaces.

BRIEF DESCRIPTION OF THE DRAWINGS

The above and other objects and features of the present invention will be clearly understood from the following description with respect to preferred embodiments thereof when considered in conjunction with the accompanying drawings, in which.

DETAILED DESCRIPTION OF THE PREFERRED EMBODIMENTS

The following description is directed by way of example to the manufacture of gear components used in automotive manual transmissions to which the simultaneous brazing and carburizing process and brazing material of the invention are specifically and appropriately applicable to braze and join a helical gear and a clutch cone during carburizing treatment.

The carburizing and brazing process is discussed followed by a discussion of a brazing material used in the process.

Figure 1A:
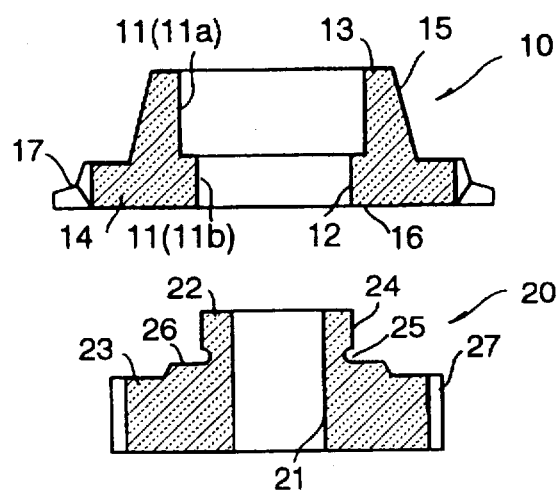
FIG. 1(A) to 1(D) are illustrations showing steps of the brazing process of an automobile transmission gear comprising two steel components according to an embodiment of the invention.
Figure 2:
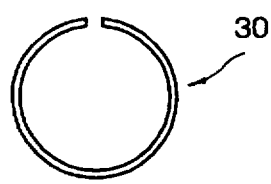
FIG. 2 is a plan view of an open-ring brazing filler.

As shown in FIG. 1(A), a clutch cone 10 and a helical gear 20 have been manufactured in a preliminary process. Clutch cone 10 has an integral configuration comprising a cylindrical shoulder 13 and a gear body 14. An axial bore 11 is formed by a large inner diameter of a cylindrical bore 11a of the cylindrical shoulder 13, and a small inner diameter of a cylindrical bore 11b of the gear body 14. The inner wall 12 of the small diameter cylindrical bore 11b and the inner peripheral portion of a lower surface 16 of gear body 14 provide a brazing joint surface. A cylindrical shoulder 13 has a tapered outer wall 15 forming a cone-shaped clutch configuration. The outer periphery of the gear body 14 is formed into gear teeth 17. The helical gear 20 is formed with an axial bore 21, a cylindrical joining bushing 22 at its upper extremity, and a gear body 23. The axial bore 21 passes through both the cylindrical joining bushing 22 and the gear body 23. The cylindrical joining bushing 22 is able to fit into the small diameter inner bore 11b of the clutch cone 10 with a slight radial tolerance between the inner wall 12 and the outer peripheral wall 24. The outer periphery of the cylindrical joining bushing 22 includes an annular groove 25 into which an open-ring brazing filler 30, such as shown in FIG. 2, is placed. The top inner periphery of the gear body 23 is formed with an upper peripheral surface 26 which is brought into contact with the lower surface 16 of the clutch cone 10 while the outer peripheral wall 24 of the cylindrical joining bushing 22 and the upper peripheral surface 26 are brazed. The outer periphery of the gear body 23 is formed at the outer periphery with gear teeth 27.

As shown in FIG. 2, the brazing filler 30 is of a previously prepared open-ring configuration and is attached to the annular groove 25 of the cylindrical joining bushing 22. The brazing ring filler 30 is constructed from a specific diameter of brazing wire material into an open-ring configuration. The composition of the brazing filler 30 has been designed as will be described later.

Figure 1B:
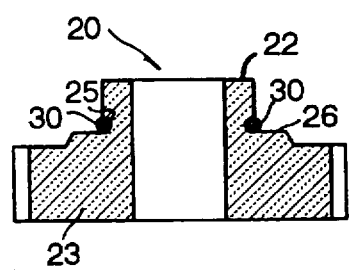
Figure 1C:
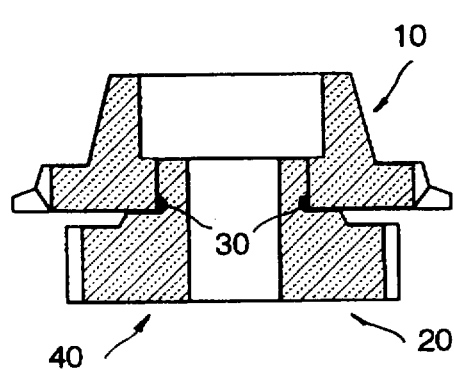

In reference to the first step in the simultaneous carburizing and brazing process, as shown in FIG. 1(B), an open-ring brazing filler 30 is placed into the annular groove 25 of the helical gear 20. Subsequently, in the second step, as shown in FIG. 1(C), the helical gear 20 and the clutch cone 10 are mutually press-joined at a specific pressure. As a result of this press-joining, the open-ring brazing filler 30 assumes a position in the annular groove 25, a clearance of 20 to 30 μm is left between the outer peripheral wall 24 and the inner wall 12, and a clearance of 40 to 80 μm is left between the inner periphery of the lower face 16 of the clutch cone 10 and the upper peripheral surface 26.

Figure 1D:
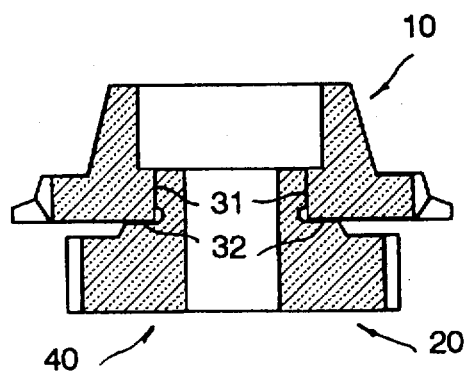

In reference to the third step, the clutch cone 10 and the helical gear 20 are subjected to a carburizing treatment in a carburizing furnace, and simultaneously brazed together during that carburizing treatment in the presence of open-ring brazing filler 30 at a specified heat pattern or schedule. This is carried out in a manner in which the clutch cone 10 and helical gear 20 are brazed together to form the integral structure of the gear component 40, as shown in FIG. 1(D). After taking the gear component 40 out from the carburizing furnace, the gear component 40 is placed into a molten salt bath in which it undergoes a quenching treatment in a specified heat pattern or schedule in the fourth step.

The following discussion concerns the thermal characteristics of the carburizing-brazing and quenching treatment taking place in the third and fourth steps.

Figure 3:
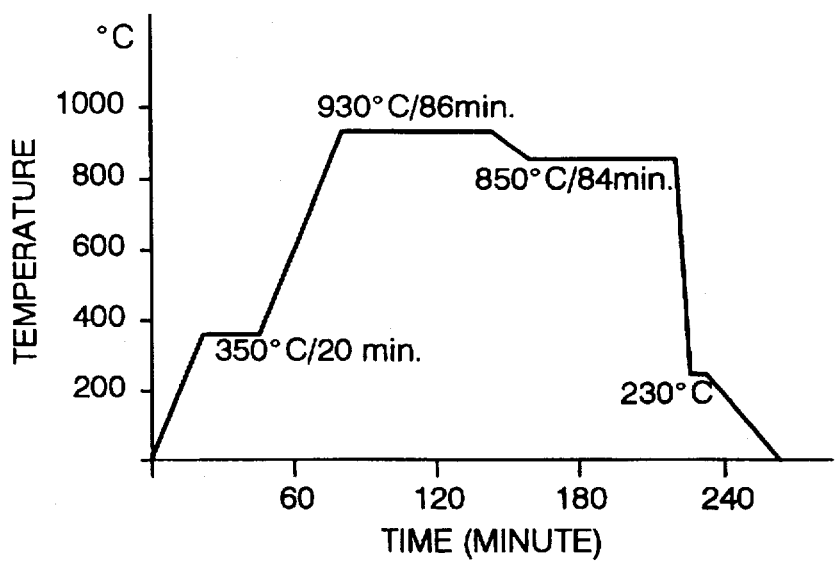
FIG. 3 is a graph of the temperature characteristic of the brazing alloy during the simultaneous brazing and carburizing process.

As shown in FIG. 3, a temperature of 350° C. is initially and preliminarily maintained for 20 minutes after which the temperature is raised to 930° C. for approximately 86 minutes to activate the carburization of the workpiece and simultaneously to melt the brazing filler 30.

Subsequently, in order to suppress thermal distortion in the workpiece during quenching, the temperature is dropped to 850° C at which ferrite crystallization will not occur, and this temperature is maintained for approximately 84 minutes. Finally, the temperature of the workpiece is reduced to 230° C. in the salt bath, during which the quenching treatment takes place. After the quenching, the workpiece is allowed to cool at an ambient or room temperature.

As will be understood from a description relating to the mechanical characteristics of the specifically formulated brazing filler 30, as the carburizing treatment progresses, the brazing filler 30 melts and fills a clearance 31 of approximately from 20 to 30 μm existing between the outer peripheral wall 24 and inner wall 12, and it also fills a clearance 32 of approximately from 40 to 80 μm existing between the inner periphery of lower surface 16 of clutch cone 10 and upper peripheral surface 26 of helical gear 20. The brazing filler 30 then assumes a completely solidified state when the temperature drops to 850° C. Because the quenching treatment is not executed while the brazing filler 30 is in the process of solidification, but executed with the brazing filler 30 in a completely solidified state, the brazed joint does not experience a decrease in mechanical strength due to thermal distortion.

As previously discussed, in order for the brazing alloy 30 to effectively exhibit its function in the process in which carburizing and brazing the clutch cone 10 and the helical gear 20 are carried out simultaneously followed by the quenching treatment, special requirements are demanded in regard to the composition and mechanical characteristics. These requirements are listed below:

1) The brazing material must be in a liquid phase at the temperature of 930° C. encountered during the carburizing treatment;

2) The brazing material must be in a solid phase at the temperature of 850° C. prior to the quenching treatment;

3) A shearing strength of more than 17.2kgf/mm$^2$ must be maintained (it is to be noted that the shearing strength is specified on the basis of a twisting strength of 500 kg.m and an ejection strength of 23 tons);

4) In order for the molten brazing alloy 30 to evenly and uniformly flow into minute gaps at the joint surfaces to wet the surfaces, it must provide an adequate wetting characteristic relative to metals, in particular steel, of which the clutch cone 10 and the helical gear 20 are made; and 5) The brazing material 30 must be formable into a wire configuration and then into a specified and desired shape suitable for a brazing process applied to the assemblies of the clutch cones 10 and the helical gears 20 in mass production.

There are specific formulations of the brazing alloy 30 containing copper (Cu) and manganese (Mn) as its main components which satisfy those requirements.

Figure 4:
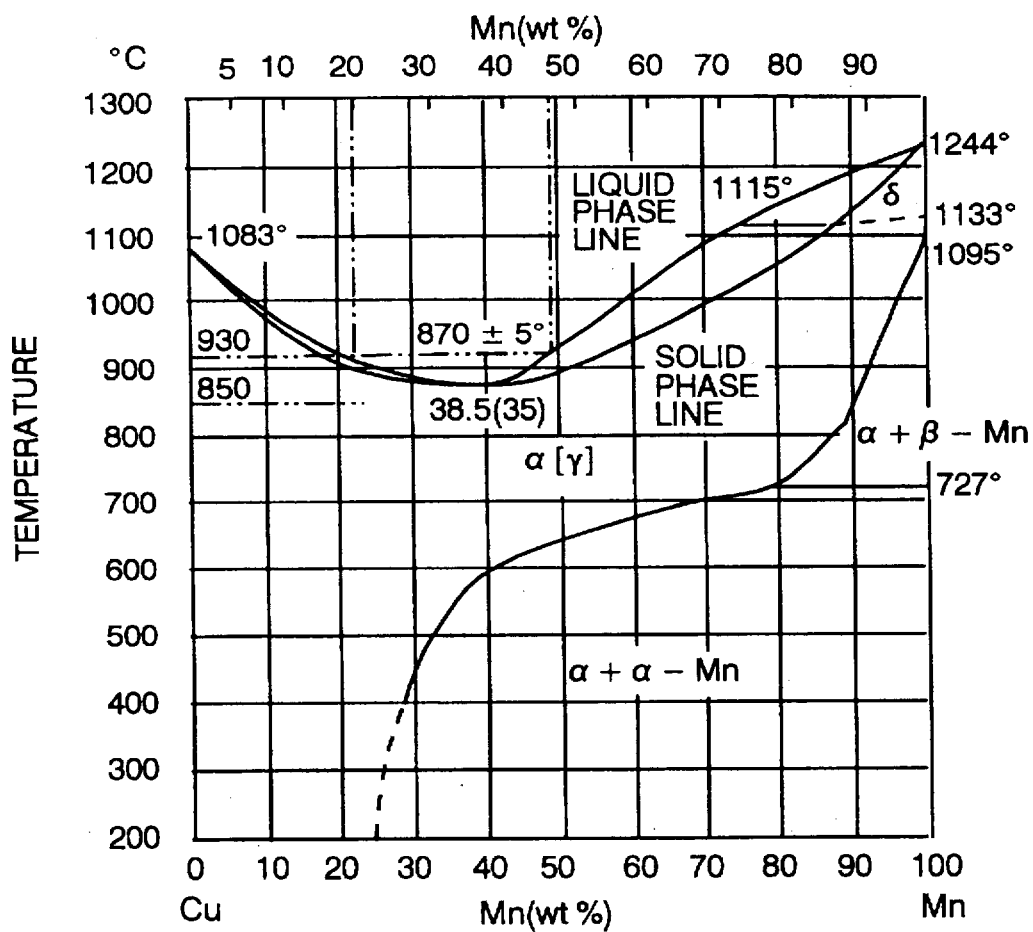
FIG. 4 is a phase diagram of a Cu—Mn brazing alloy.

As shown in FIG. 4 illustrating a phase diagram of two-component Cu—Mn brazing alloy, in order for the brazing alloy to satisfy the first and second requirements discussed previously, it is necessary for the manganese (Mn) component to comprise from 20 to 45 weight % of the total weight of brazing material. A 38.5 weight % of manganese (Mn) component provides the lowest melting point at 870° C. While the inclusion of manganese (Mn) in the brazing alloy makes it difficult to form the brazing alloy into a wire configuration, experimentation by brazing material manufactures have shown that the brazing alloy does not harden excessively in the range where most of an α-solid solution educes, thus allowing the brazing alloy to be sufficiently formed into a wire configuration. A brazing alloy which includes a nickel (Ni) additive improves the wetting characteristic of the molten brazing alloy 30 in relation to the steel components, and increases the strength of the brazed joint.

Figures 5, 6:
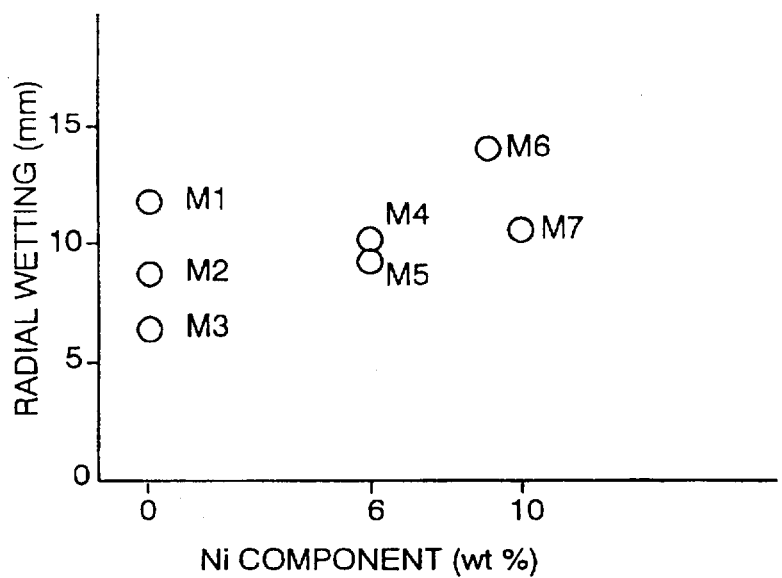
FIG. 5 is a table showing compositions for seven types of brazing alloys.
FIG. 6 is a graph showing the result of wetting tests for the seven types of brazing alloys.

Evaluation tests were conducted by the inventor to evaluate wetting characteristics of seven types of brazing alloys listed as M1 through M7 in FIG. 5. In these wetting evaluation tests, 1 g of a sample of each brazing alloy was placed on a steel plate and melted through the application of a plasma spark. The radial wetting of the steel plate was measured and the results are shown in FIG. 6. From these tests, it was ascertained, as shown in FIG. 6, that the wetting characteristic improves as the contained amount of the nickel (Ni) component is increased. Even if a nickel (Ni) component is not contained in the brazing alloy, adjusting the formulation of the brazing alloy with an appropriate type of flux or fusing materials results, to a certain extent, in an improved wetting characteristic.

Figure 7:
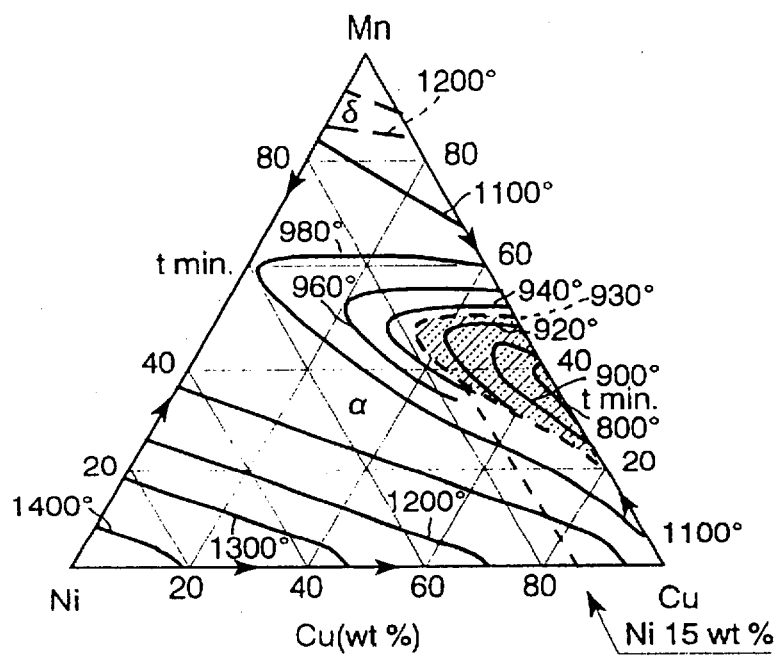
FIG. 7 is a state diagram of a Cu—Mn—Ni brazing alloy.

From the fact that increasing the proportion of the contained manganese (Mn) component is accompanied by a raise in melting point of the brazing alloy and an increase in proportion of the included nickel (Ni) component also raises the melting point of the brazing alloy, it can be seen from FIG. 7 (showing a phase diagram of Cu—Mn—Ni three component brazing material) that in order for the Cu—Mn—Ni brazing alloy to reliably maintain a liquid phase at 930° C. during the carburizing treatment, it is essential to contain the nickel (Ni) component to less than 15 weight %.

Figure 8:
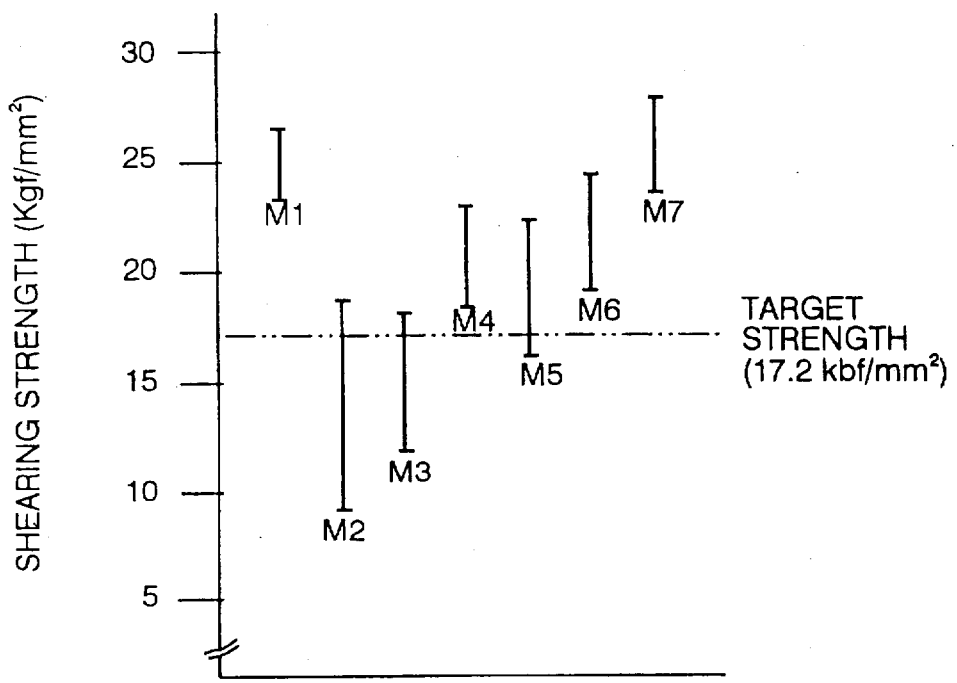
FIG. 8 is a graph showing the result of brazed joint strength tests for the seven types of brazing alloys.

FIG. 8 shows the results of joint strength tests applied to the brazing alloy formulations M1 through M7 listed in FIG. 5. While the brazing alloy sample M1 demonstrated a sufficient level of joint strength, the brazing alloy samples M2 and M3 demonstrated a lower joint strength. This does not, however, make them inapplicable as a desired brazing material. The brazing alloy samples M4 through M7 demonstrated a sufficient joint strength in addition to the most desirable wetting characteristic.

Viewing the above test results, the following brazing alloy formulations are proved to be highly appropriate for application to the brazing process in which the clutch cone 10 and the helical gear 20, as multiple steel components, can be simultaneously carburized and brazed and subsequently subjected to the quenching treatment.

1) A Cu—Mn brazing alloy containing copper (Cu) and manganese (Mn), as its main components, with the manganese (Mn) component in an amount between 20 to 45 weight % of the total weight of the brazing alloy;

2) A Cu—Mn brazing alloy containing copper (Cu) and manganese (Mn), as its main components, with the copper (Cu) component in an amount between 55 to 80 weight % and the manganese (Mn) component in an amount between 20 to 45 weight %, of the total weight of the brazing alloy;

3) A Cu—Mn—Ni brazing alloy containing copper (Cu) and manganese (Mn), as its main components, with the manganese (Mn) component in an amount between 20 to 45 weight % and a nickel (Ni) additive in an amount between zero to 15 weight % of the total weight of the brazing alloy;

4) A Cu—Mn—Ni brazing alloy containing copper (Cu) and manganese (Mn), as its main components, with the manganese (Mn) component in an amount between 20 to 45 weight % and the nickel (Ni) additive in an amount between 0 to 15 weight % of the total weight of the brazing alloy; and 5) A Cu—Mn—Ni brazing alloy containing more than 45 weight % of a copper (Cu) component, a manganese (Mn) component in an amount between 20 to 45 weight %, and a nickel (Ni) component in an amount between zero to 15 weight % of the total weight of the brazing alloy.

Partial changes may be made to the above-mentioned brazing alloys. Specifically, while the brazing process and the brazing alloy have been devised as brazing fillers for a gear assembly 40 consisting of the clutch cone 10 and the helical gear 20 as brazing objects, the brazing process and brazing alloys of the invention are by no means limited in application to those objects. They may in fact be appropriately and freely applied to other steel components. They are further not limited in application to two steel components, but are applicable to brazing three or more than three steel components. Furthermore, while the brazing alloy 30 has been proposed as an open-ring filler made from a wire configuration, the brazing filler 30 may also be constructed in a closed-ring configuration.

In regard to the brazing alloy formulations specified as 1) and 2) above, metallic elements other than copper (Cu), manganese (Mn), and nickel (Ni) may be contained in small or minute amounts to form these brazing alloys. Additionally, while the brazing alloy filler 30 is presented as particularly suitable for brazing steel components, it may also be applied to brazing various mechanical components made from materials, other than steel, including ductile cast iron components, copper alloy components, aluminum alloy components and combinations of these components.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A brazing method for brazing at least two metal components, said brazing method comprising the steps of:
   positioning a brazing alloy, containing copper (Cu) and manganese (Mn) as its main components, in close proximity to a position where the metal components are to be brazed;
   carburizing the metal components with the brazing alloy attached thereto at a temperature higher than a melting point of the brazing alloy; and
   quenching the metal components after said step of carburizing.

2. A brazing method as defined in claim 1, further comprising the steps of providing the brazing alloy with copper in an amount between 55 and 80 weight % of a total weight of the brazing alloy and providing manganese in an amount between 20 and 45 weight % of a total weight of the brazing alloy.

3. A brazing method as defined in claim 1, further comprising the steps of providing the brazing alloy with copper and manganese as its main components and providing nickel as an additive, said step of providing the brazing alloy with copper and manganese including providing manganese in an amount between 20 and 45 weight % of a total weight of the brazing alloy and said step of providing nickel as an additive includes providing nickel in an amount between 0 and 15 weight % of the total weight of the brazing alloy.

4. A brazing method as defined in claim 1, further comprising the step of providing a helical gear and a clutch cone as the at least two metal components which are assembled as an integral gear for an automobile automatic transmission.

5. A brazing method as defined in claim 4, further comprising the step of preparing the brazing alloy as an open-ring filler made from a wire configuration prior to said step of positioning a brazing alloy.

6. A brazing method as defined in claim 4, further comprising the step of preparing the brazing alloy as a closed-ring filler made from a wire configuration prior to said step of positioning a brazing alloy.

7. A brazing method as defined in claim 4, wherein said step of quenching is executed at a temperature lower than the melting point of the brazing alloy.

8. A brazing method as defined in claim 7, further comprising the steps of providing the brazing alloy with copper in an amount between 55 and 80 weight % of a total weight of the brazing alloy and providing manganese in an amount between 20 and 45 weight % of a total weight of the brazing alloy.

9. A brazing method as defined in claim 7, further comprising the steps of providing the brazing alloy with copper and manganese as its main components and providing nickel as an additive, said step of providing the brazing alloy with copper and manganese including providing manganese in an amount between 20 and 45 weight % of a total weight of the brazing alloy and said step of providing nickel as an additive includes providing nickel in an amount between 0 and 15 weight % of the total weight of the brazing alloy.

10. A brazing method of brazing at least two metal components, said brazing method comprising the steps of:
    positioning a brazing alloy, containing copper (Cu) and manganese (Mn) as its main components, in close proximity to a position where the metal components are to be brazed;
    heating the metal components to a carburizing temperature above a melting point of the brazing alloy in a carburizing furnace and maintaining the carburizing temperature for a specified period of time; and
    reducing the temperature of the metal components to a quenching temperature, lower than the melting point of the brazing alloy, in a salt bath and maintaining the quenching temperature for a predetermined period of time; and cooling the metal components at ambient temperature.

* * * * *